US00RE41260E

(19) United States
(12) Reissued Patent
Hu

(10) Patent Number: US RE41,260 E
(45) Date of Reissued Patent: Apr. 27, 2010

(54) RETAINER RING FOR SECURELY RETAINING A FIRST OBJECT TO A SECOND OBJECT

(76) Inventor: Bobby Hu, 8F, No. 536-1, Ta Chin Street, Taichung (TW)

(21) Appl. No.: 11/366,985

(22) Filed: Mar. 2, 2006

Related U.S. Patent Documents

Reissue of:
(64) Patent No.: 6,698,320
Issued: Mar. 2, 2004
Appl. No.: 10/102,658
Filed: Mar. 21, 2002

(51) Int. Cl.
*B23B 23/00* (2006.01)

(52) U.S. Cl. ..... 81/438
(58) Field of Classification Search ..... 81/438, 81/439, 177.85, 177.5, 490, 125.1
See application file for complete search history.

(56) References Cited

U.S. PATENT DOCUMENTS

| | | | | |
|---|---|---|---|---|
| 1,384,655 | A | 7/1921 | Allmon | 81/124.3 |
| 1,936,352 | A | 11/1933 | Dixon | 81/119 |
| 2,320,044 | A | 5/1943 | Merriman | 81/125 |
| 2,488,894 | A | 11/1949 | Barrett | 81/124.1 |
| 2,671,368 | A | 3/1954 | Diebold | 81/119 |
| 2,727,418 | A | 12/1955 | Moon | 81/121 |
| 2,751,802 | A | 6/1956 | Ruillard | 81/121 |
| 2,769,360 | A | 11/1956 | Cottrell et al. | 81/121 |
| 2,774,259 | A | 12/1956 | Caulkins | 76/114 |
| 2,801,561 | A | 8/1957 | Bonner | 81/90 |
| 2,805,594 | A | 9/1957 | Fogel | 81/125 |
| 2,806,706 | A | 9/1957 | Fitch | 279/79 |
| 2,880,637 | A | 4/1959 | Koenig | 81/10 |
| 3,347,293 | A | 10/1967 | Clark | 145/50 |
| 4,096,896 | A | 6/1978 | Engel | 145/50 B |
| 4,139,036 | A | 2/1979 | Regan et al. | 145/46 |
| 4,324,158 | A | 4/1982 | Le Roy | 81/60 |
| 4,459,716 | A | 7/1984 | Valadez | 7/100 |
| 4,480,511 | A | 11/1984 | Nickipuck | 81/177 |
| 4,520,697 | A | 6/1985 | Moetteli | 81/62 |
| 4,699,029 | A | 10/1987 | Kelly et al. | 81/121.1 |
| 4,787,278 | A | 11/1988 | Bononi | 81/438 |
| 5,042,333 | A | 8/1991 | Huang | 81/438 |
| 5,067,775 | A | 11/1991 | D'Angelo | 299/86 |
| 5,136,902 | A | 8/1992 | Ma | 81/119 |
| 5,218,891 | A | 6/1993 | Olson et al. | 81/125.1 |
| 5,230,263 | A | 7/1993 | Kwaka | 81/125.1 |
| 5,295,422 | A | 3/1994 | Chow | 81/124.3 |
| 5,307,713 | A | 5/1994 | White | 81/180.1 |
| 5,640,889 | A | 6/1997 | Anderson | 81/125 |
| 5,791,848 | A | 8/1998 | Lanham | 411/373 |
| 5,842,394 | A | 12/1998 | Hwang | 81/439 |
| 5,865,074 | A | 2/1999 | Hsieh | 81/124.3 |
| 5,918,512 | A | 7/1999 | Habermehl et al. | 81/438 |
| 5,946,989 | A | 9/1999 | Hsieh | 81/124.3 |
| 5,975,186 | A | 11/1999 | Day | 160/321 |
| 6,305,255 | B1 | 10/2001 | Wu | 81/439 |
| 6,332,382 | B1 | 12/2001 | Anderson et al. | 81/438 |
| 6,494,121 | B1 * | 12/2002 | Hu | 81/439 |
| 6,634,261 | B1 | 10/2003 | Griffin | 81/124.1 |
| 6,691,593 | B2 | 2/2004 | Hu | 81/60 |
| 6,698,320 | B2 * | 3/2004 | Hu | 81/438 |
| 6,701,808 | B2 | 3/2004 | Hsieh | 81/124.3 |
| 6,860,176 | B1 | 3/2005 | Hsien | 81/124.1 |

* cited by examiner

*Primary Examiner*—Lee D Wilson
(74) *Attorney, Agent, or Firm*—Alan Kamrath; Kamrath & Associates PA

(57) ABSTRACT

A resilient retainer ring comprises at least two pressing sections and at least one engaging section. Each pressing section presses against a bottom wall defining an annular groove in a receiving compartment of a screwdriver shank when the retainer ring is mounted in the annular groove of the screwdriver shank. The engaging section is exposed to at least one corner of the receiving compartment such that the engaging section has at least a portion engaged in a retaining groove of a bit when an end of the bit is received in the receiving compartment of the screwdriver shank.

28 Claims, 8 Drawing Sheets

Fig. 1

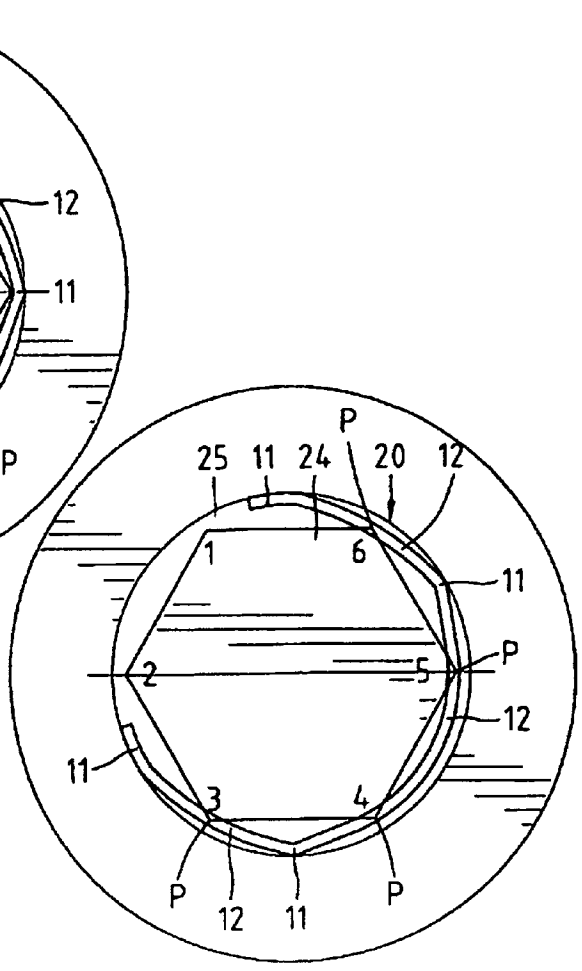
Fig. 5B
Fig. 5C
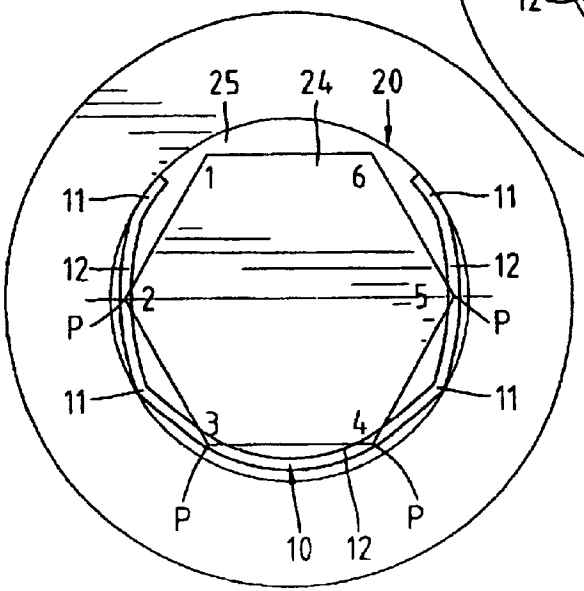
Fig. 5A

RETAINER RING FOR SECURELY RETAINING A FIRST OBJECT TO A SECOND OBJECT

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a retainer ring for securely retaining a first object, e.g., a bit, to a second object, e.g., a shank of a screwdriver.

2. Description of the Related Art

FIG. 6A of the drawings illustrates a conventional retainer ring 1 engaged in an annular groove 3 defined in an inner periphery of a receiving compartment 2 of an object, e.g., a screwdriver shank. After mounting in the annular groove 3, the retainer ring 1 could move to a position shown in FIG. 6B under the action of gravity. This is because there is no means for securely retaining *the* retainer ring 1 in the annular groove 3. As a result, as illustrated in FIG. 7, it would be impossible to mount a bit 4 into the receiving compartment 2, as the retainer ring 1 protrudes too much outward to be inserted into the receiving compartment 2.

SUMMARY OF THE INVENTION

An object of the present invention is to provide a retainer ring for securely retaining a first object, e.g., a bit, to a second object, e.g., a screwdriver shank.

In accordance with the present invention, a combination of a first object, a second object, and a retainer ring is provided. The combination comprises a first object including a retaining groove in an end thereof, a second object including a receiving compartment for removably receiving the end of the first object, and a resilient retainer ring. The receiving compartment has a plurality of corners. An annular groove is defined in an inner periphery defining the receiving compartment. The resilient retainer ring is received in the annular groove of the second object and includes at least two pressing sections and at least one engaging section. Each pressing section presses against a bottom wall defining the annular groove of the second object. The engaging section is exposed to at least one corner of the receiving compartment such that the engaging section has at least a portion engaged in the retaining groove when the end of the first object is received in the receiving compartment.

Other objects, advantages, and novel features of the invention will become more apparent from the following detailed description when taken in conjunction with the accompanying drawings.

BRIEF DESCRIPTION OF THE DRAWINGS

FIG. 5A is a sectional view illustrating engagement of a further modified embodiment of the retainer ring and a shank of the screwdriver.

FIG. 5B is a view similar to FIG. 5A, wherein the retainer ring is rotated 30° in a counterclockwise direction.

FIG. 5C is a view similar to FIG. 5A, wherein the retainer ring is rotated 60° in a counterclockwise direction.

DETAILED DESCRIPTION OF THE PREFERRED EMBODIMENTS

Figure 1:
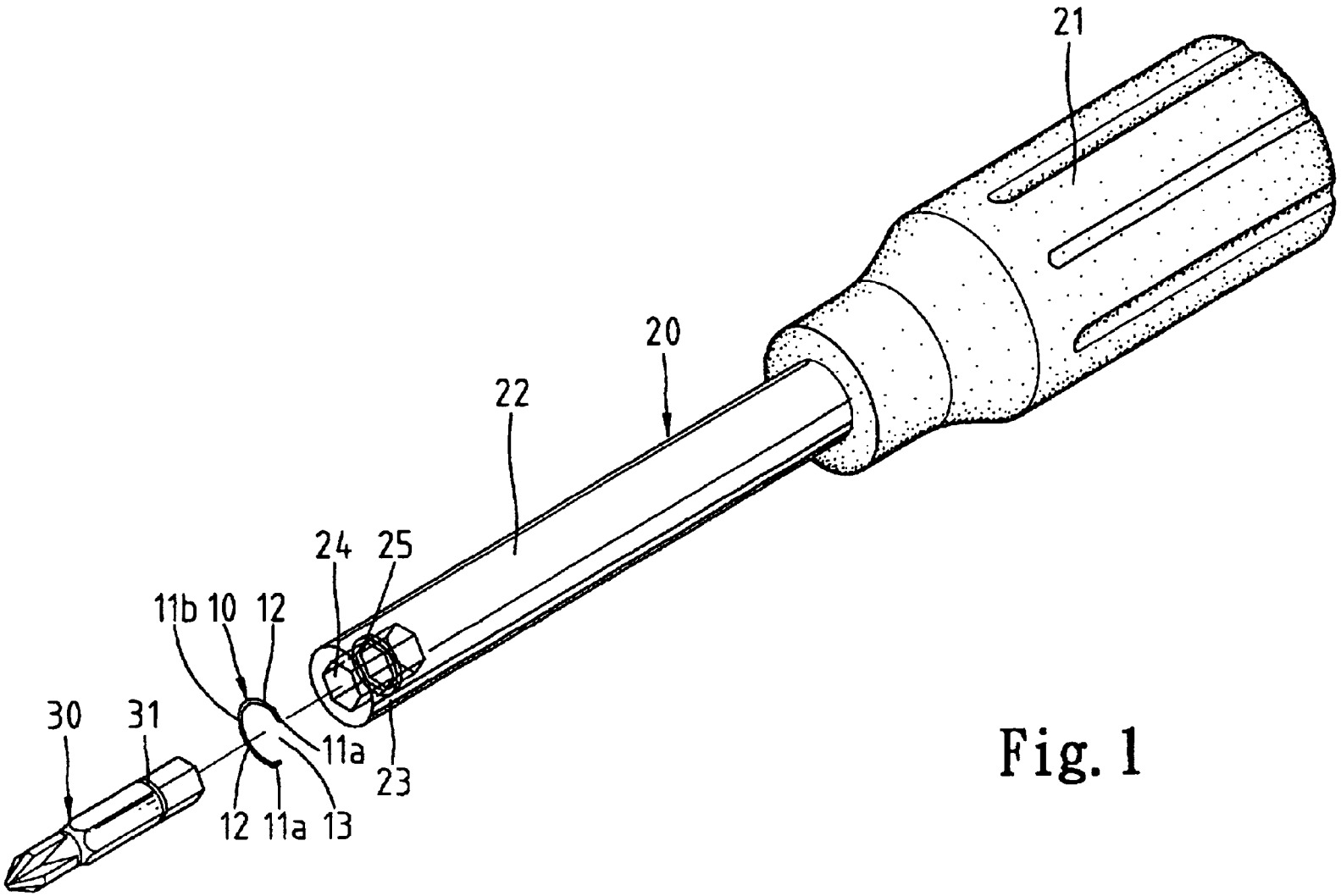
FIG. 1 is an exploded perspective view of a screwdriver, a bit, and a retainer ring in accordance with the present invention.

Referring to FIG. 1, in accordance with the present invention, a retainer ring 10 is provided to securely retain a first object, e.g., a bit 30 to a second object, e.g., a shank 22 of a screwdriver 20. The screwdriver 20 includes a handle 21 attached to an end of the shank 22. A generally hexagonal receiving compartment 24 is defined in the other end 23 of the shank. An annular groove 25 is defined in an inner periphery defining the receiving compartment 24.

Figure 2A:
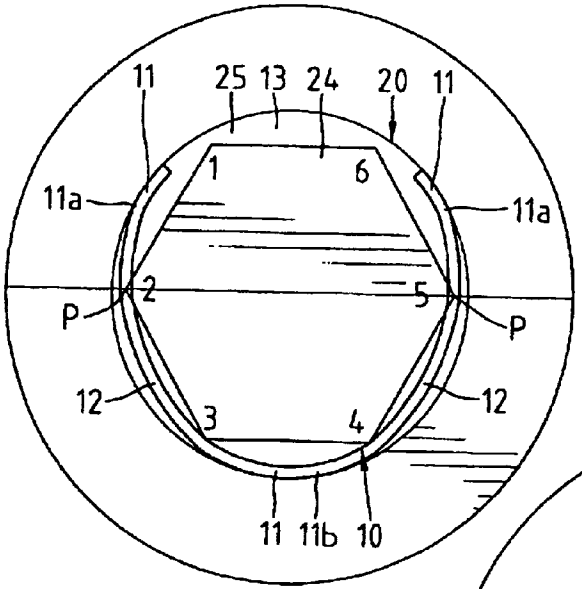
FIG. 2A is a sectional view illustrating engagement of the retainer ring and a shank of the screwdriver.

Referring to FIGS. 1 and 2A, the retainer ring 10 is a substantially C-shaped resilient ring having an opening 13 between the distal ends 11a thereof. The retainer ring 10 includes at least two radially outward pressing sections 11 that press against a bottom wall defining the annular groove 25 of the shank 25 and at least one radially inward engaging section 12. Namely, the engaging section 12 is located in a position radially inward of the pressing sections 11. In this embodiment, the retainer ring 10 includes three pressing sections 11 located on the distal ends 11a of the retainer ring 10 and a section 11b of the retainer ring 10 opposite to the openings 13 of the retainer ring 10. It is noted that the opening 13 of the retainer ring 10 is smaller than a half of a circumference of a circle on which the retainer ring 10 locates. Further, the retainer ring 10 includes two engaging sections 12 on both sides of the section 11b opposite to the opening 13 of the retainer ring 10.

As illustrated in FIG. 2A, when the retainer ring 10 is mounted into the annular groove 25 of the shank 22 of the screwdriver 20, the retainer ring 10 is securely retained in the annular groove 25 of the shank 22, as the pressing sections 11 press against the bottom wall defining the annular groove 25 of the shank 22. Further, the engaging sections 12 are respectively exposed to the second corner and the fifth corner of the receiving compartment 24 of the shank 22 (see the intersections P).

Thus, when a bit 30 is inserted into the receiving compartment 24 of the shank 22, the retainer ring 10 would not move or wobble in the annular groove 25 of the shank 22, as the three pressing sections 11 of the retainer ring 10 press against the bottom wall defining the annular groove 25 of the shank 22. Further, each engaging section 12 has a portion P engaged in a retaining groove 31 in a hexagonal end of the bit 30. Thus, the bit 30 is securely engaged in the receiving compartment 24 of the screwdriver 20.

Figure 2B:
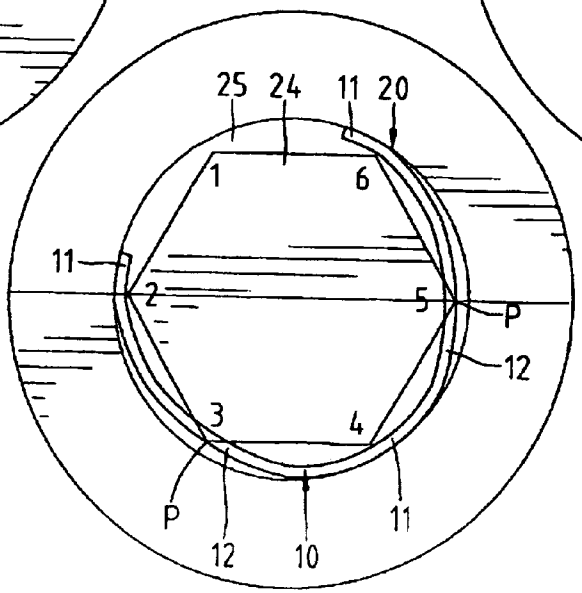
FIG. 2B is a view similar to FIG. 2A, wherein the retainer ring is rotated 30° in a counterclockwise direction.

Referring to FIG. 2B, when the retainer ring 10 is engaged in the annular groove 25 in another position, e.g., the retainer ring 10 is rotated 30° in a counterclockwise direction, the retainer ring 10 is securely retained in the annular groove 25 of the shank 22, as the pressing sections 11 press against the bottom wall defining the annular groove 25 of the shank 22. Further, the engaging sections 12 are respectively exposed to the third corner and the fifth corner of the receiving compartment 24 of the shank 22 (see the intersections P).

Thus, when a bit 30 is inserted into the receiving compartment 24 of the shank 22, the retainer ring 10 would not move to wobble in the annular groove 25 of the shank 22, as the three pressing sections 11 of the retainer ring 10 press against the bottom wall defining the annular groove 25 of the shank 22. Further, each engaging section 12 has a portion P engaged in the retaining groove 31 of the bit 30. Thus, the bit 30 is securely engaged in the receiving compartment 24 of the screwdriver 20.

Figure 2C:
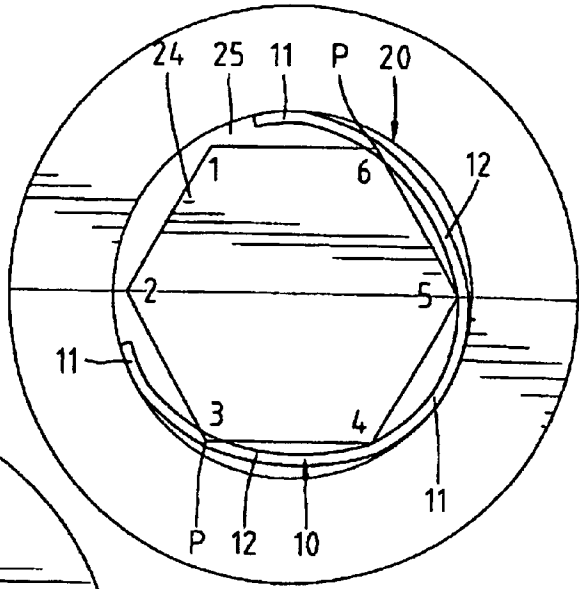
FIG. 2C is a view similar to FIG. 2A, wherein the retainer ring is rotated 60° in a counterclockwise direction.

Referring to FIG. 2C, when the retaining ring 10 is engaged in the annular groove 25 in another position, e.g., the retainer ring 10 is further rotated through 30° along the counterclockwise direction, the retainer ring 10 is securely retained in the annular groove 25 of the shank 22, as the pressing sections 11 press against the bottom wall defining the annular groove 25 of the shank 22. Further, the engaging sections 12 are respectively exposed to the third corner and the sixth corner of the receiving compartment 24 of the shank 22 (see the intersections P).

Thus, when a bit 30 is inserted into the receiving compartment 24 of the shank 22, the retainer ring 10 would not move or wobble in the annular groove 25 of the shank 22, as the three pressing sections 11 of the retainer ring 10 press against the bottom wall defining the annular groove 25 of the shank 22. Further, each engaging section 12 has a portion P engaged in the retaining groove 31 of the bit 30. Thus, the bit 30 is securely engaged in the receiving compartment 24 of the screwdriver 20.

Figures 3A, 3B, 3C:
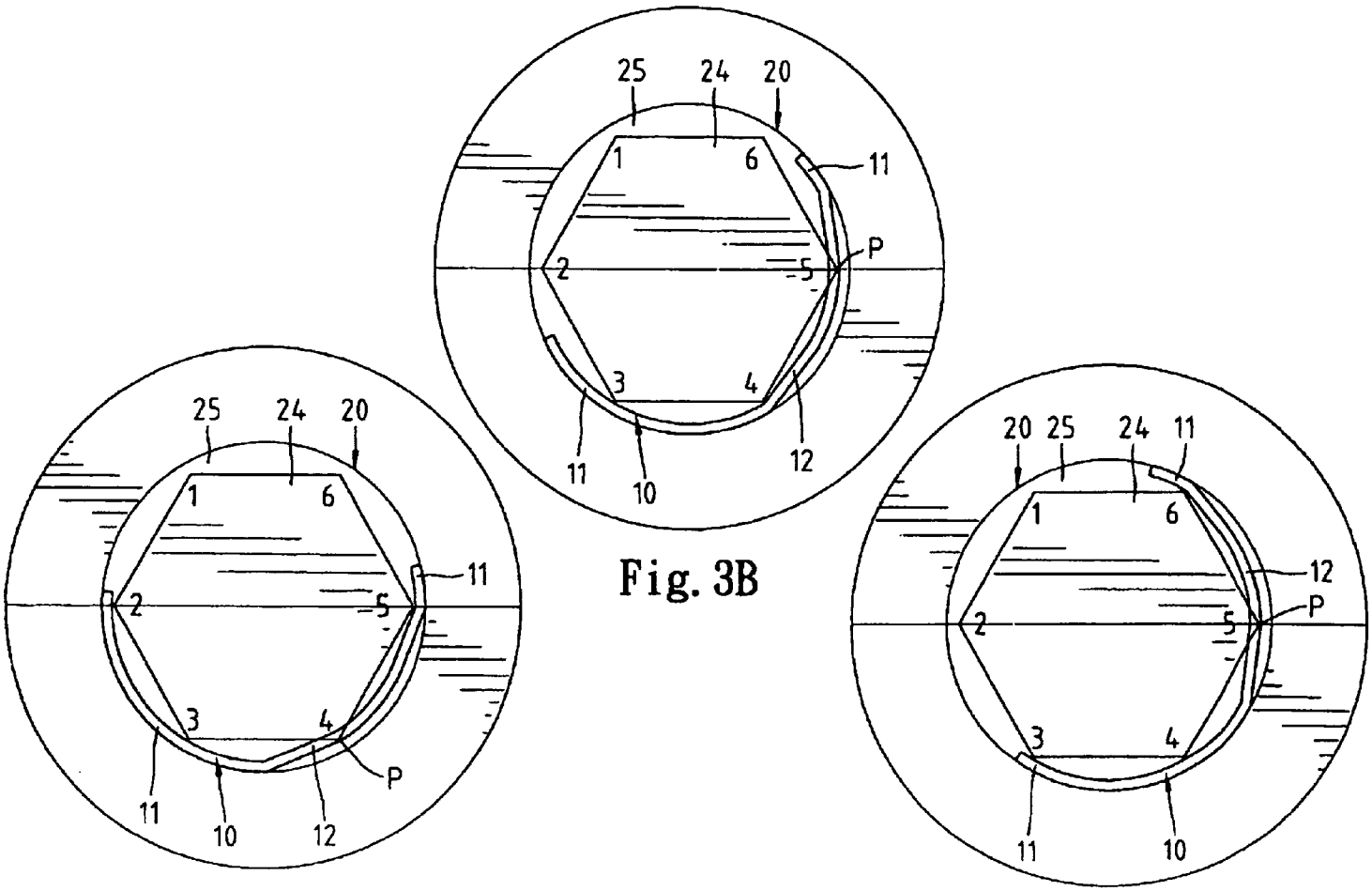
FIG. 3A is a sectional view illustrating engagement of a modified embodiment of the retainer ring and a shank of the screwdriver.
FIG. 3B is a view similar to FIG. 3A, wherein the retainer ring is rotated 30° in a counterclockwise direction.
FIG. 3C is a view similar to FIG. 3A, wherein the retainer ring is rotated 60° in a counterclockwise direction.

FIG. 3A illustrates a modified embodiment of the retainer ring 10, wherein like numerals denote like elements. In this embodiment, the retainer ring 10 includes two radially outward pressing sections 11 and a radially inward engaging section 12 between the pressing sections 11. One of the pressing sections 11 has a length approximately half of the retainer ring 10, while the other pressing section 11 is much shorter.

As illustrated in FIG. 3A, when the retainer ring 10 is mounted into the annular groove 25 of the shank 22 of the screwdriver 20, the retainer ring 10 is securely retained in the annular groove 25 of the shank 22, as the pressing sections 11 press against the bottom wall defining the annular groove 25 of the shank 22. Further, the engaging section 12 is exposed to the fourth corner of the receiving compartment 24 of the shank 22 (see the intersection P).

Thus, when a bit 30 is inserted into the receiving compartment 24 of the shank 22, the retainer ring 10 would not move or wobble in the annular groove 25 of the shank 22, as the pressing sections 11 of the retainer ring 10 press against the bottom wall defining the annular groove 25 of the shank 22. Further, the engaging section 12 has a portion P engaged in the retaining groove 31 of the bit 30. Thus, the bit 30 is securely engaged in the receiving compartment 24 of the screwdriver 20.

Referring to FIG. [3D] *3B*, when the retainer ring 10 is engaged in the annular groove 25 in another position, e.g., the retainer ring 10 is rotated 30° in a counterclockwise direction, the retainer ring 10 is securely retained in the annular groove 25 of the shank 22, as the pressing sections 11 press against the bottom wall defining the annular groove 25 of the shank 22. Further, the engaging section 12 is exposed to the fifth corner of the receiving compartment 24 of the shank 22 (see the intersection P).

Thus, when a bit 30 is inserted into the receiving compartment 24 of the shank 22, the retainer ring 10 would not move or wobble in the annular groove 25 of the shank 22, as the three pressing sections 11 of the retainer ring 10 press against the bottom wall defining the annular groove 25 of the shank 22. Further, the engaging section 12 has a portion P engaged in the retaining groove 31 of the bit 30. Thus, the bit 30 is securely engaged in the receiving compartment 24 of the screwdriver 20.

Referring to FIG. 3C, when the retainer ring 10 is engaged in the annular groove 25 in another position, e.g., the retainer ring 10 is further rotated 30° in a counterclockwise direction, the retainer ring 10 is securely retained in the annular groove 25 of the shank 22, as the pressing sections 11 press against the bottom wall defining the annular groove 25 of the shank 22. Further, the engaging section 12 is exposed to the fifth corner of the receiving compartment 24 of the shank 22 (see the intersection P).

Thus, when a bit 30 is inserted into the receiving compartment 24 of the shank 22, the retainer ring 10 would not move or wobble in the annular groove 25 of the shank 22, as the three pressing sections 11 of the retainer ring 10 press against the bottom wall defining the annular groove 25 of the shank 22. Further, the engaging section 12 has a portion P engaged in the retaining groove 31 of the bit 30. Thus, the bit 30 is securely engaged in the receiving compartment 24 of the screwdriver 20.

Figure 4C:
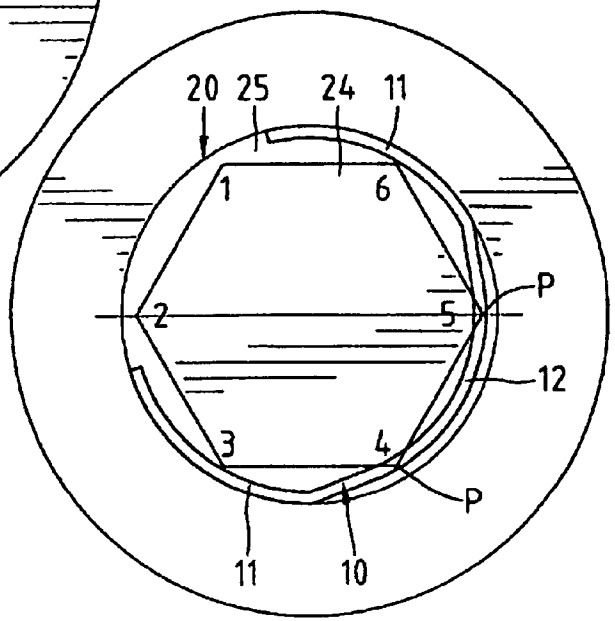
FIG. 4C is a view similar to FIG. 4A, wherein the retainer ring is rotated 60° in a counterclockwise direction.
Figure 4B:
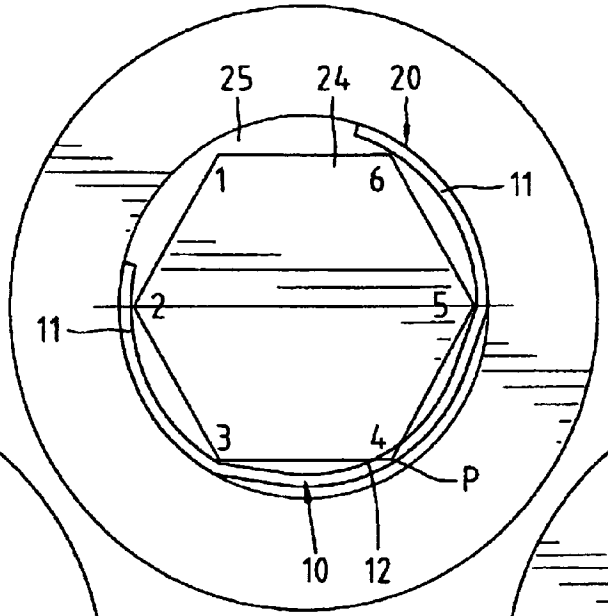
FIG. 4B is a view similar to FIG. 4A, wherein the retainer ring is rotated 30° in a counterclockwise direction.
Figure 4A:
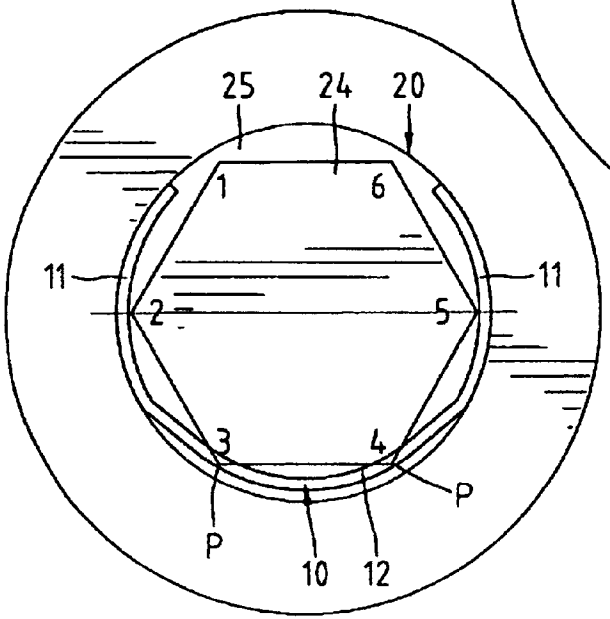
FIG. 4A is a sectional view illustrating engagement of another modified embodiment of the retainer ring and a shank of the screwdriver.
Figure 6A:
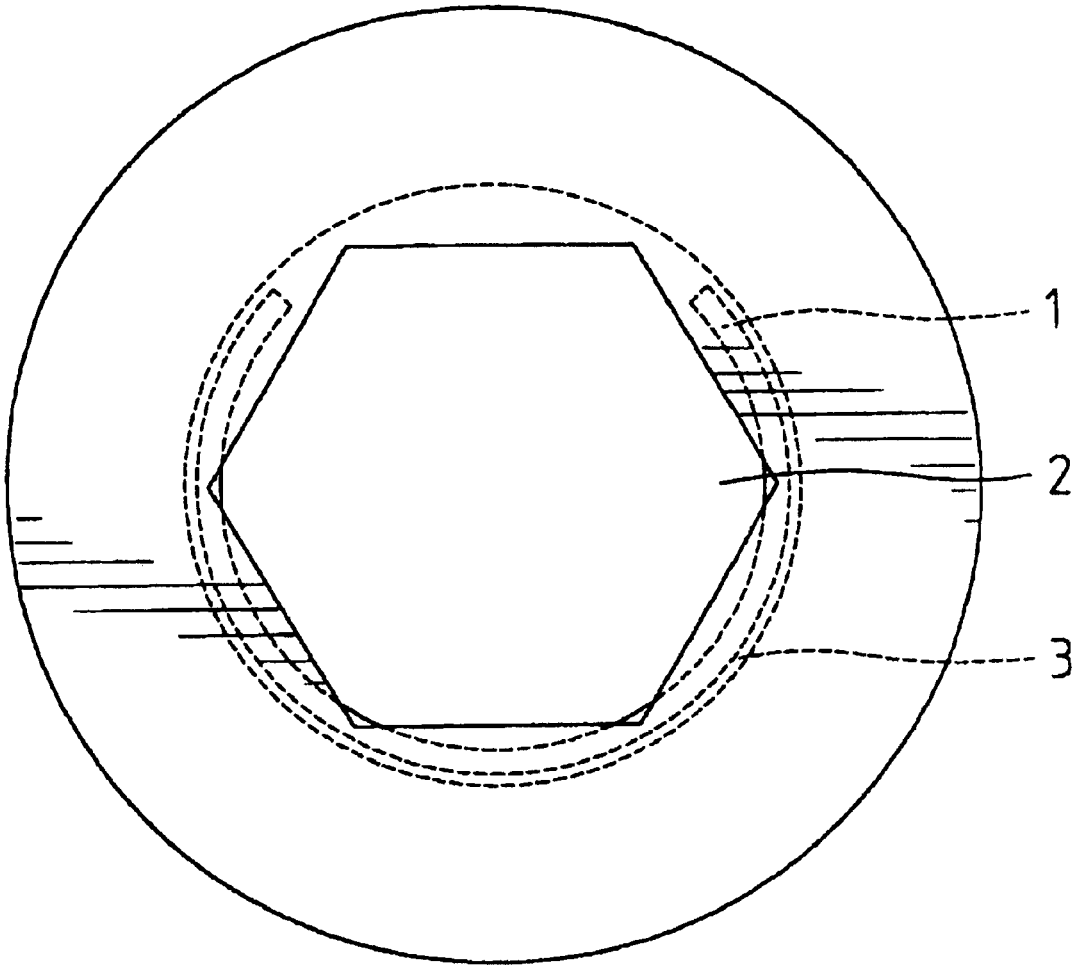
Fig. 6A PRIOR ART
FIG. 6A is a sectional view illustrating engagement between a conventional retainer ring and a screwdriver shank.
Figure 6B:
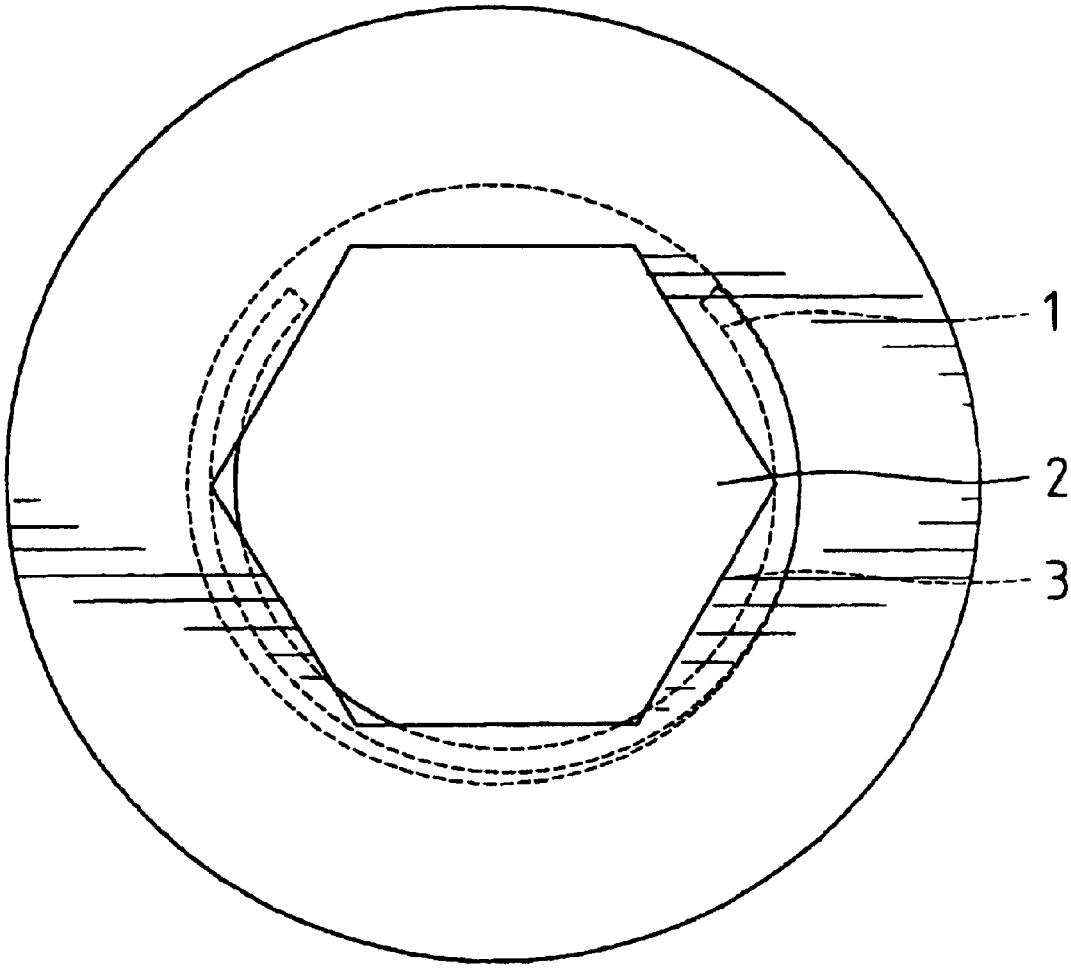
Fig. 6B PRIOR ART
FIG. 6B is a sectional view illustrating anomalous engagement between the retainer ring and the screwdriver shank in FIG. 6A.
Figure 7:
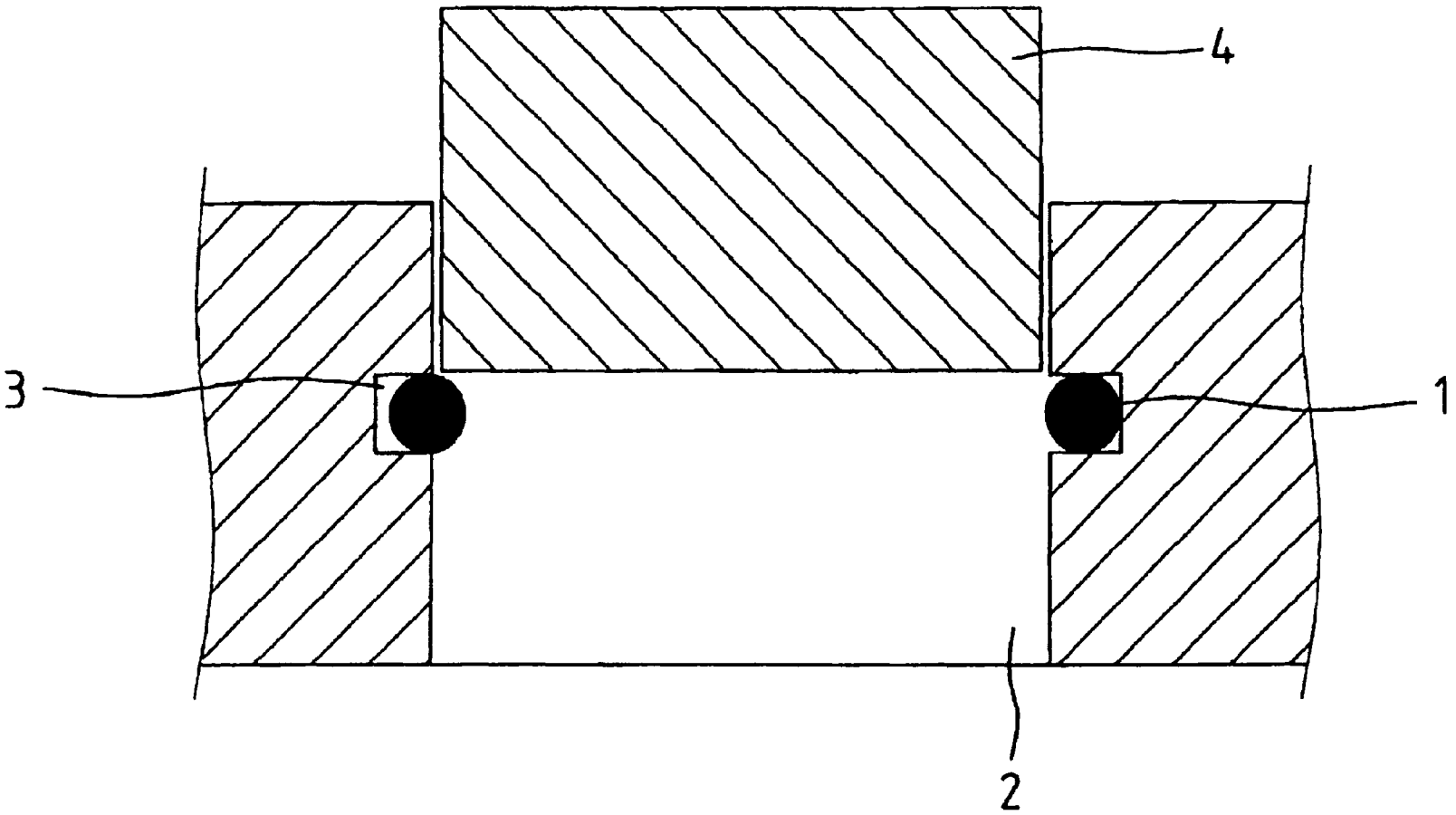
Fig. 7 PRIOR ART
FIG. 7 is a schematic sectional view illustrating difficulty of attaching a bit to the screwdriver shank when the retainer ring is anomalously engaged with the screwdriver shank.

FIG. 4A illustrates another modified embodiment of the retainer ring 10, wherein like numerals denote like elements. In this embodiment, the retainer ring 10 includes a radially inward engaging section 12 opposite to the opening 13 of the retainer ring 10 and two radially outward pressing sections [ii] *11* on both sides of the engaging section 12. Each radially outward pressing sections 11 includes an associated one of the distal ends (not labeled) of the retainer ring 10.

As illustrated in FIG. 4A, when the retainer ring 10 is mounted into the annular groove 25 of the shank 22 of the screwdriver 20, the retainer ring 10 is securely retained in the annular groove 25 of the shank 22, as the pressing sections 11 press against the bottom wall defining the annular grooves 25 of the shank 22. Further, the engaging section 12 is exposed to the third corner and the fourth corner of the receiving compartment 24 of the shank 22 (see the intersections P).

Thus, when a bit 30 is inserted into the receiving compartment 24 of the shank 22, the retainer ring 10 would not move or wobble in the annular groove 25 of the shank 22, as the pressing sections 11 of the retainer ring 10 press against the bottom wall defining the annular groove 25 of the shank 22. Further, the engaging section 12 has two portions P engaged in the retaining groove 31 of the bit 30. Thus, the bit 30 is securely engaged in the receiving compartment 24 of the screwdriver 20.

Referring to FIG. 4B when the retainer ring 10 is engaged in the annular groove 25 in another position, e.g., the retainer ring 10 is rotated 30° in a counterclockwise direction, the retainer ring 10 is securely retained in the annular groove 25 of the shank 22, as the pressing sections 11 press against the bottom wall defining the annular groove 25 of the shank 22. Further, the engaging section 12 is exposed to the fourth corner of the receiving compartment 24 of the shank 22 (see the intersection P).

Thus, when a bit 30 is inserted into the receiving compartment 24 of the shank 22, the retainer ring 10 would not move or wobble in the annular groove 25 of the shank 22, as the pressing section 11 of the retainer ring 10 press against the bottom wall defining the annular groove 25 of the shank 22. Further, the engaging section 12 is engaged in the retaining groove 31 of the bit 30. Thus, the bit 30 is securely engaged in the receiving compartment 24 of the screwdriver 20.

Referring to FIG. 4C, when the retainer ring 10 is engaged in the annular groove 25 in another position, e.g., the retainer ring 10 is further rotated 30° in a counterclockwise direction, the retainer ring 10 is securely retained in the annular groove 25 of the shank 22, as the pressing sections 11 press against the bottom wall defining the annular groove 25 of the shank 22. Further, the engaging section 12 is exposed to the fourth corner and the fifth corner of the receiving compartment 24 of the shank 22 (see the intersection P).

Thus, when a bit 30 is inserted into the receiving compartment 24 of the shank 22, the retainer ring 10 would not move or wobble in the annular groove 25 of the shank 22, as the pressing sections 11 of the retainer ring 10 press against the bottom wall defining the annular groove 25 of the shank 22. Further, the engaging section 12 has two portions P engaged in the retaining groove 31 of the bit 30. Thus, the bit 30 is securely engaged in the receiving compartment 24 of the screwdriver 20.

FIG. 5A illustrates a further modified embodiment of the retainer ring 10, wherein like numerals denotes like elements. In this embodiment, the retainer ring 10 includes four radially outward pressing sections 11 and three radially inward engaging sections 12, wherein each engaging section 12 is located between two pressing sections 11.

As illustrated in FIG. 5A, when the retainer ring 10 is mounted into the annular groove 25 of the shank 22 of the screwdriver 20, the retainer ring 10 is securely retained in the annular groove 25 of the shank 22, as the pressing sections 11 press against the bottom wall defining the annular groove 25 of the shank 22. Further, the engaging sections 12 are exposed to the second corner, the third corner, the fourth corner, and the fifth corner of the receiving compartment 24 of the shank 22 (see the intersections P).

Thus, when a bit 30 is inserted into the receiving compartment 24 of the shank 22, the retainer ring 10 would not move or wobble in the annular groove 25 of the shank 22, as the pressing sections 11 of the retainer ring 10 press against the bottom wall defining the annular groove 25 of the shank 22. Further, the engaging sections 12 have portions P engaged in the retaining groove 31 of the bit 30. Thus, the bit 30 is securely engaged in the receiving compartment 24 of the screwdriver 20.

Referring to FIG. 5B, when the retainer ring 10 is engaged in the annular groove 25 in another position, e.g., the retainer ring 10 is rotated 30° in a counterclockwise direction, the retainer ring 10 is securely retained in the annular groove 25 of the shank 22, as the pressing sections 11 press against the bottom wall defining the annular groove 25 of the shank 22. Further, the middle engaging section 12 is exposed to the fourth corner of the receiving compartment 24 of the shank 22 (see the intersection P).

Thus, when a bit 30 is inserted into the receiving compartment 24 of the shank 22, the retainer ring 10 would not move or wobble in the annular groove 25 of the shank 22, as the pressing sections 11 of the retainer ring 10 press against the bottom wall defining the annular groove 25 of the shank 22. Further, the middle engaging section 12 has a portion P engaged in the retaining groove 31 of the bit 30. Thus, the bit 30 is securely engaged in the receiving compartment 24 of the screwdriver 20.

Referring to FIG. 5C, when the retainer ring 10 is engaged in the annular groove 25 in another position, e.g., the retainer ring 10 is further rotated 30° in a counterclockwise direction, the retainer ring 10 is securely retained in the annular groove 25 of the shank 22, as the pressing sections 11 press against the bottom wall defining the annular groove 25 of the shank 22. Further, the engaging sections 12 are exposed to the third corner, the fourth corner, the fifth corner, and the sixth corner of the receiving compartment 24 of the shank 22 (see the intersections P).

Thus, when a bit 30 is inserted into the receiving compartment 24 of the shank 22, the retainer ring 10 would not move or wobble in the annular groove 25 of the shank 22, as the pressing sections 11 of the retainer ring 10 press against the bottom wall defining the annular groove 25 of the shank 22. Further, the engaging sections 12 have portions P engaged in the retaining groove 31 of the bit 30. Thus, the bit 30 is securely engaged in the receiving compartment 24 of the screwdriver 20.

According to the above description, it is noted that the engaging section(s) 12 of the retainer ring 10 includes at least one portion that is securely engaged in the retaining groove 31 of the bit 30 regardless of the angular position of the retainer ring 10 in the annular groove 25 of the shank 22 of the screwdriver 20.

It is noted that the numbers and the shapes of the pressing sections 11 and the engaging sections 12 may vary according to the need.

Although the invention has been explained in relation to its preferred embodiment, it is to be understood that many other possible modifications and variations can be made without departing form the scope of the invention as hereinafter claimed.

What is claimed is:

1. A combination comprising:

a first object including a retaining groove in an end thereof;

a second object including a receiving compartment for removably receiving said end of said first object, said receiving compartment having a plurality of corners, an annular groove being defined in an inner periphery defining said receiving compartment; and a resilient retainer ring received in the annular groove, said retainer ring including at least two pressing sections and at least one engaging section, with said at least two pressing sections separated by said at least one engaging section, wherein both of said at least two pressing sections simultaneously press against a bottom wall defining said annular groove of said second object and are located outside of the retaining groove, with said at least two pressing sections holding said at least one engaging section away from the bottom wall defining said annular groove, wherein said at least one engaging section is exposed to at least one of said corners of said receiving compartment by being held by said at least two pressing sections simultaneously pressing against the annular groove such that said at least one engaging section has at least a portion engaged in said retaining groove when said end of said first object is received in said receiving compartment.

2. The combination as claimed in claim 1, wherein said retainer ring includes two distal ends spaced by an opening, each of said distal ends of said retainer forming an associated one of said at least two pressing sections.

3. The combination as claimed in claim 2, wherein one of said at least two pressing sections is opposite to said opening.

4. The combination as claimed in claim 3, wherein said first object is a bit and said second object is a shank of a screwdriver.

5. The combination as claimed in claim 4, wherein said receiving compartment is hexagonal and said end of said first object is hexagonal.

6. The combination as claimed in claim 3, wherein said receiving compartment is hexagonal and said end of said first object is hexagonal.

7. The combination as claimed in claim 2, wherein said first object is a bit and said second object is a shank of a screwdriver.

8. The combination as claimed in claim 7, wherein said receiving compartment is hexagonal and said end of said first object is hexagonal.

9. The combination as claimed in claim 2, wherein said receiving compartment is hexagonal and said end of said first object is hexagonal.

10. The combination as claimed in claim 1, wherein said retainer ring includes an opening and wherein one of said at least one engaging section of said retainer ring is opposite to said opening.

11. The combination as claimed in claim 10, wherein said first object is a bit and said second object is a shank of a screwdriver.

12. The combination as claimed in claim 11, wherein said receiving compartment is hexagonal and said end of said first object is hexagonal.

13. The combination as claimed in claim 10, wherein said receiving compartment is hexagonal and said end of said first object is hexagonal.

14. The combination as claimed in claim 1, wherein one of said at least two pressing sections is longer than another of said at least two pressing sections.

15. The combination as claimed in claim 14, wherein said first object is a bit and said second object is a shank of a screwdriver.

16. The combination as claimed in claim 14, wherein said receiving compartment is hexagonal and said end of said first object is hexagonal.

17. The combination as claimed in claim 1, wherein said retainer ring includes a plurality of alternately disposed pressing sections and engaging sections.

18. The combination as claimed in claim 1, wherein said first object is a bit and said second object is a shank of a screwdriver.

19. The combination as claimed in claim 1, wherein said receiving compartment is hexagonal and said end of said first object is hexagonal.

20. The combination as claimed in claim 19, wherein said first object is a bit and said second object is a shank of a screwdriver.

*21. A combination comprising:*

*an object including a receiving compartment adapted for removably receiving another object, said receiving compartment having a plurality of corners, an annular groove being defined in an inner periphery defining said receiving compartment; and*

*a resilient retainer ring received in the annular groove, said retainer ring including at least two pressing sections and at least one engaging section, with said at least two pressing sections separated by said at least one engaging section, wherein both of said at least two pressing sections simultaneously press against a bottom wall defining said annular groove of said object, with said at least two pressing sections holding said at least one engaging section away from the bottom wall defining said annular groove, wherein said at least one engaging section is exposed to at least one of said corners of said receiving compartment by being held by said at least two pressing sections simultaneously pressing against the bottom wall defining said annular groove such that said at least one engaging section has at least a portion engaged with said another object when said another object is received in said receiving compartment.*

*22. The combination as claimed in claim 21, wherein said retainer ring includes two distal ends spaced by an opening, each of said distal ends of said retainer forming an associated one of said at least two pressing sections.*

*23. The combination as claimed in claim 22, wherein one of said at least two pressing sections is opposite to said opening.*

*24. The combination as claimed in claim 21, wherein said retainer ring includes an opening and wherein one of said at least one engaging section of said retainer ring is opposite to said opening.*

*25. The combination as claimed in claim 21, wherein one of said at least two pressing sections is longer than another of said at least two pressing sections.*

*26. The combination as claimed in claim 21, wherein said retainer ring includes a plurality of alternately disposed pressing sections and engaging sections.*

*27. The combination as claimed in claim 21, wherein said another object is a bit and said object is a shank of a screwdriver.*

*28. The combination as claimed in claim 21, wherein said receiving compartment is hexagonal and said another object is hexagonal.*

* * * * *